April 30, 1963 — H. E. GETTEL — 3,087,770
PIVOTING AND SLIDING TRAY ASSEMBLY
Filed April 17, 1961 — 2 Sheets-Sheet 1
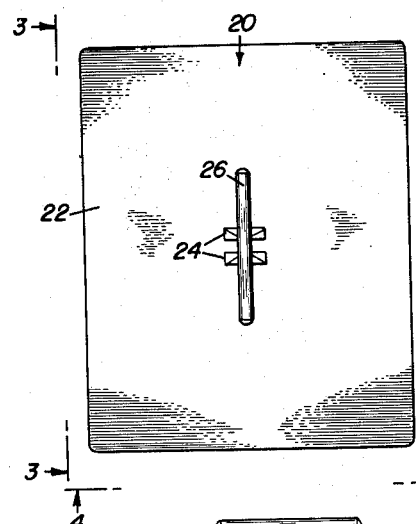
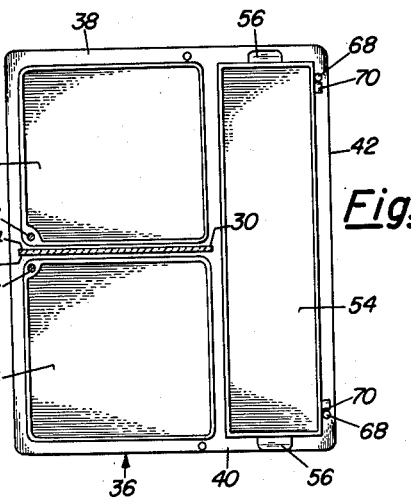
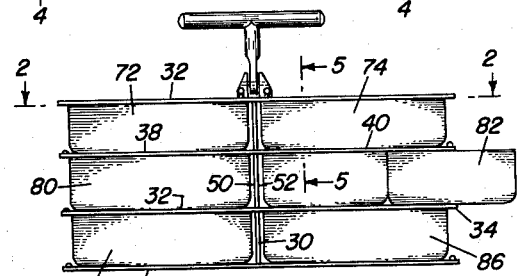
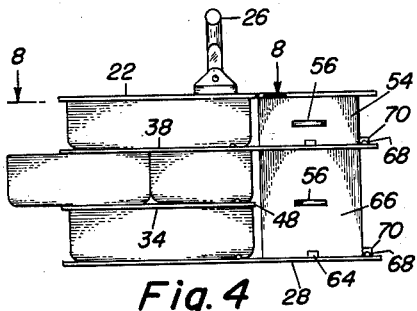
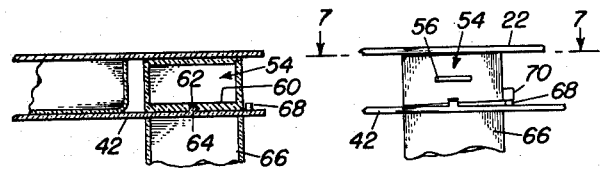
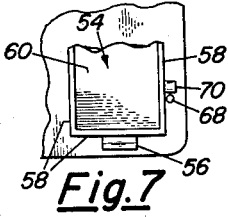
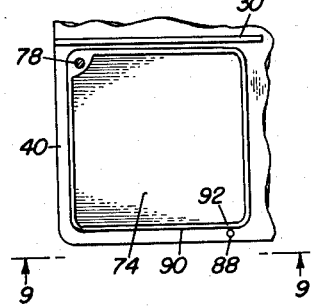
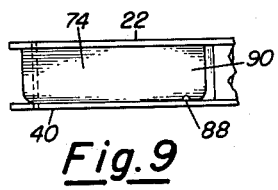
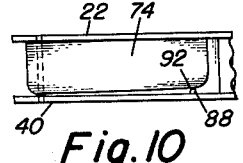
INVENTOR.
HENRY E. GETTEL
BY Fulwider, Mattingly
& Huntley
ATTORNEYS April 30, 1963     H. E. GETTEL     3,087,770

PIVOTING AND SLIDING TRAY ASSEMBLY

Filed April 17, 1961     2 Sheets-Sheet 2

INVENTOR.
HENRY E. GETTEL
BY Fulwider, Mattingly
& Huntley
ATTORNEYS

United States Patent Office 3,087,770
Patented Apr. 30, 1963

3,087,770
PIVOTING AND SLIDING TRAY ASSEMBLY
Henry E. Gettel, 3936 9th Ave., San Diego, Calif.
Filed Apr. 17, 1961, Ser. No. 107,614
16 Claims. (Cl. 312—270)

The present invention is a continuation-in-part of my co-pending application Serial No. 67,731, filed November 7, 1960, and now abandoned entitled "Pivoting Tray Assembly."

The present invention relates to cabinets of the type having sliding and/or swinging drawers.

The cabinet of the present invention includes a main frame, having an upright, a floor having an end connected with the upright, a cover disposed above the floor and having an end connected with the upright. These covers may be arranged in tiers so that they also function as floors. The cabinet also includes a drawer or superimposed drawers whose side walls substantially span the gap or gaps between the floors and the covers. The floor or the cover is provided with an abutment which lies in the path of an abutment on the drawer so as to form a stop for restraining the movement of the drawer when it is in its closed position.

The floor and/or the cover are formed of material which is sufficiently flexible to yield to beyond abutting relationship of the abutments whereby the drawer can be opened when intentional opening pressure is applied thereto. Such material however, should also be resilient so that the cover or floor returns to its normal position after the abutments have been passed beyond contact with one another, and such material should also be sufficiently inherently stable for supporting the drawer and it snormal contents whereby the cover will not sag to such a degree as to be brought into binding relationship with the drawer therebelow when said cover is also functioning as a floor for a drawer or tray thereabove.

In another aspect of the invention, the drawer can be placed in either of two shiftable positions. In one position, the abutments are aligned whereby they function as stops for restraining the movement of the drawer when it is in closed position. When in the other position, the stops are not in alignment whereby the drawer can be moved readily from its closed position.

The advantages will be apparent from the following description, reference being had to the accompanying drawings wherein preferred embodiments of the invention are illustrated.

In the drawings:

FIG. 1 is a top plan view in elevation of one aspect of the improved cabinet;

FIG. 2 is a top plan view partly in section looking in the direction of arrows 2—2 of FIG. 3;

FIG. 3 is an elevational view looking in the direction of arrow 3 of FIG. 1 but showing one of the drawers partly open;

FIG. 4 is an elevational view looking in the direction of arrow 4 of FIG. 1 but showing one of the drawers partly open;

FIG. 5 is a fragmentary sectional view looking in the direction of arrows 5—5 of FIG. 3;

FIG. 6 is a fragmentary view showing one of the drawers riding on one of the abutments, the view being a fragment of that shown in FIG. 4;

FIG. 7 is a view looking in the direction of arrows 7—7 of FIG. 6;

FIG. 8 is a fragmentary view looking in the direction of arrows 8—8 of FIG. 4;

FIG. 9 is a view looking in the direction of arrow 9 of FIG. 8;

FIG. 10 is a view similar to FIG. 9 but showing the cover handle floor flexed whereby the abutments are out of abutting relationship;

Figure 11:
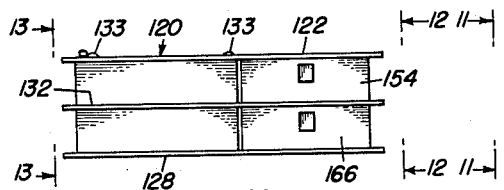
FIG. 11 is an elevation view of another aspect of the present invention looking in the direction of arrow 11 of FIG. 12.
Figure 12:
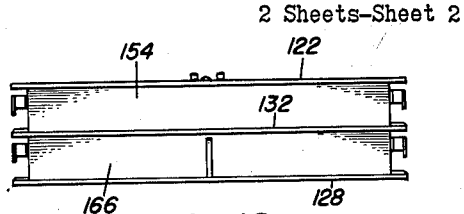
FIG. 12 is an elevation view looking in the direction of arrow 12 of FIG. 11.
Figure 14:
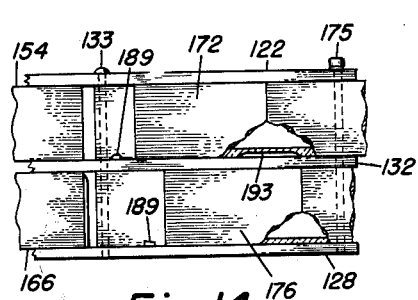
FIG. 14 is a fragmentary view looking in the direction of arrow 14 of FIG. 13 but on a somewhat larger scale, parts of the pivotally mounted drawers being shown in sections.
Figure 13:
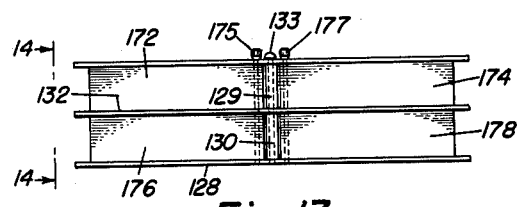
FIG. 13 is an elevation view looking in the direction of arrow 13 of FIG. 11.
Figure 17:
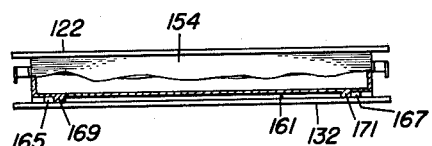
FIG. 17 is a side view of one of the floors for the sliding drawer and showing one of the drawers partially in section.

Referring more in detail to FIGS. 1 to 10 of the drawings, the cabinet 20 includes a top wall or cover 22 which is provided at the center with two upstanding ears or bosses 24 which are spaced from one another for pivotally receiving a handle 26 by which the cabinet is carried. The cabinet 20 also includes a floor 28 and an upright 30 which is secured to the floor 28 and to the top or cover 22. As will be seen more clearly from FIG. 2, this upright 30 comprises a vertically extending wall.

The cabinet also includes a plurality of horizontally extending partitions 32, 34 and 36. These partitions are supported solely by the wall 30. As viewed in FIG. 2, the partition 36 is co-extensive with the cover 22 and floor 28 and includes three sections 38, 40 and 42. The confronting ends of the sections 38 and 40 are joined, respectively, with the wall 30 at 44 and 46. Also as viewed in FIG. 2, the section 42 extends rearwardly beyond the sections 38 and 40. As viewed in FIG. 4, the partition 34 ends at 48, and such ending also obtains with respect to partition 32. The confronting ends of partitions 32 and 34 are secured to the wall 30 in the same manner as explained with respect to the edges of sections 38 and 40 as at 50 and 52. The floor 28, the wall 30, the cover 22, and the partitions 32 to 36 inclusive, may be said to constitute the frame of the cabinet. Thus the floor 28 and the partitions, aforementioned, form a plurality of superimposed tiers for supporting drawers of trays.

As will be seen more clearly from FIG. 2, the rear section 42 of partition 36 supports a drawer 54 having handles 56 at the opposite ends thereof. The side walls 58 extend substantially to the under side of the cover 22 and thus the under side of the cover, in cooperation with the side wall, provides a substantially dust-proof drawer, it being understood that the side wall as herein used comprises the front and rear of the drawer also. Either the side of the floor 60 of the drawer 50 or the top side of the partition section 42 is provided with a groove and the other two of the elements is provided with a tenon, and as herein shown this groove is shown at 62 and the under side of the floor 60 and the tenon 64 is shown on the top side of the partition section 42, and this groove and tenon are utilized for guiding the drawer 54. A considerably deeper drawer 66 is carried directly by the floor 28 and like drawer 54, the side walls extend to adjacent the under side of the partition section 42. This drawer 66 and the upper side of this section 42 provides a floor for the drawer 54.

As will be seen more clearly from FIGS. 5, 6, and 7, the sections 42 is provided with an upwardly extending abutment 68 adjacent the right edge of the partition. This abutment may be formed integrally with the section 42. The right side wall of the drawer 54 is provided with an outwardly extending abutment 70. The abutment 68 lies in the path of the abutment 70 as the drawer is pulled forwardly as viewed in FIG. 6 or downwardly as viewed in FIG. 7. Thus these abutments yieldingly restrain the movement of the drawer 54. As viewed in FIG. 2, it will be seen that like abutments are provided at the opposite end of the drawer 54 and on the partition section 42.

The floors and/or the covers are formed of material which is sufficiently flexible so that they can yield to beyond abutting relationship of the abutments 68 and 70, whereby the drawer can be pulled outwardly, i.e. opened, when intentional opening pressure is applied thereto. FIG. 6 shows the abutment 70 in a position where it is sliding over the abutment 68. In this event, either the cover 22 or the section 42 is flexed sufficiently for permitting the abutment 70 to slide over abutment 68, or, the floor 42 or the cover 22 can be flexed substantially equally to permit the abutment 70 to slide over the abutment 68.

Such material for the floors or covers should be resilient so that the cover or floor or both return to their normal position after the abutments have passed beyond contact with one another, and, such material should also be sufficiently inherently stable for supporting the drawer and its normal contents whereby, when the floor is also actuating as a cover for the drawer therebelow, it will not sag to such a degree as to be brought into binding relationship with the top of the drawer therebelow.

As will be seen more clearly from FIG. 2, the partition 36 supports swinging drawers 72 and 74 on partition sections 38 and 40 respectively. These drawers are pivotally supported on vertically extending pins 76 and 78, respectively. Like drawers 80 and 82 are pivotally supported on partitions 32 and 34, respectively, and like drawers 84 and 86 are supported below drawers 80 and 82, respectively, and carried by the floor 28. The pin 76 extends through drawers 72, 80 and 84, and the pin 78 extends through drawers 74, 82 and 86. These drawers when in closed position abut the wall 30.

The partition sections 38 and 40 and the partitions 32 and 34 are each provided with an abutment 88, as is more clearly shown in FIGS. 8, 9, and 10. Th lower end of the side wall 90 provides an abutment 92. Each of the abutments 88 lies in the path of movement of the abutment 92 and normally restrains initial outward swinging movement of the drawer. As previously explained, the material of which the floors and/or covers is formed, is of sufficient flexibility to yield to beyond abutting relationship of the abutments whereby the swinging drawers can be swung outwardly when intentional opening pressure is applied thereto. FIG. 9 shows the drawer in its closed position and FIG. 10 shows the flexing of the cover 22 and/or the partition 40 or both, whereby the abutment 92 is sliding over the abutment 88.

One of the materials that may be employed is a plastic, and if desired the entire frame including the floor, the cover, the partitions and the wall 30 may be cast integrally. Too, this plastic may be of transparent material whereby the contents can be viewed from the exterior while the drawers are in closed position. The cabinet is not limited in size, and suggested uses of the same are for sewing materials such as needles, thread, buttons, etc., jewelery or fishing tackle.

Referring now to the aspect of the invention shown in FIGS. 11 to 19, there the cabinet is shown at 120 and it includes a top wall or cover 122, a floor 128 and two superimposed uprights in the form of walls 129 and 130. The cabinet also includes a horizontally extending partition 132. The partition 132 is supported solely by the upright wall 130 and the cover 122 is supported solely by the upright wall 129. Screws 133 extend downwardly, respectively, through the cover 122, the upright wall 129, the horizontal partition 132, the upright 130, and is threaded into the floor 128.

The partition 132 forms a floor for drawers thereabove. As is shown in FIG. 11, the right side of the cabinet supports drawers 154 and 166, the drawer 154 being slidably mounted on the horizontal partition 132. As is more clearly shown in FIG. 19, the floor 128 and the partition 132 are each provided with an upwardly extending tenon 164 and the under side of the floors 160 of the drawer are each provided with a groove 162. In this manner the drawers 154 and 166 are guided.

The under side of the floor of drawer 154 is provided with grooves 161 and 163 which are arranged parallelly of the groove 162. The horizontal partition 132 is provided with two upwardly extending bosses 165 and 167 forming shoulders or abutments. Bosses 169 and 171 extend downwardly from the bottom of the drawer 154 and are disposed adjacent the front and rear of the drawer and extend into the groove 161. These bosses 169 and 171 are disposed inwardly of the abutments 165 and 167 when the drawer 154 is in the closed position.

As explained with respect to the embodiment shown in FIGS. 1 to 10, the cover 122 and/or the partition 132 are sufficiently resilient so as to flex sufficiently to permit the drawer bosses 169 or 171 to vertically clear the abutments 165 and 167, respectively. In this manner the drawer 154 is prevented from being accidentally withdrawn from its closed position but can be opened by either pulling upwardly and forwardly on the drawer.

Figure 18:
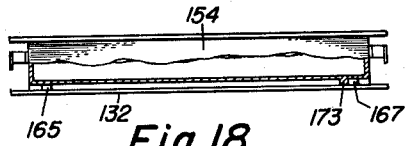
FIG. 18 is a view similar to FIG. 17 but showing the sliding drawer reversed in position.
Figure 16:
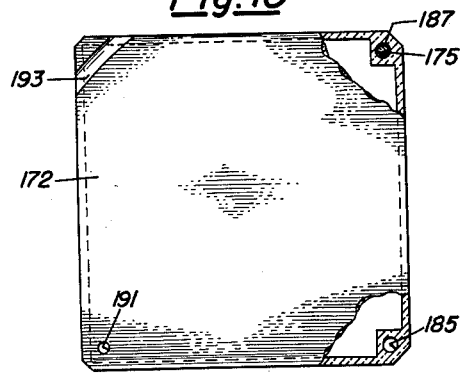
FIG. 16 is a view similar to FIG. 15 but showing the drawer rotated 90 degrees from a position shown in FIG. 15.
Figure 19:
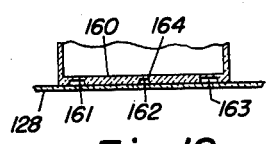
FIG. 19 is a fragmentary end view of one of the floors.

The other groove 163 is provided with only one downwardly extending boss 173. FIG. 18, shows the drawer 154 reversed in position or turned 180 degrees with respect to the position shown in FIG. 17. It will be seen that the boss 173, when engaging abutment 167, limits the movement of the drawer 154 to its closed position when the drawer is moved to the right as viewed in FIG. 18. However, the drawer can be pulled to the left until the boss 173 engages the abutment 165. In this manner the drawer can be readily opened without flexing the floor cover or partition. However, it can be removed intentionally from its position by either flexing the cover 122 or the partition 132 so that the boss 173 rides across the abutment 165.

The floor 128 and the partition 132 pivotally support the swinging drawers 172, 174, 176 and 178. Two corners 181 and 183 of each of these drawers are enlarged and are vertically drilled as to 185 and 187 for receiving pins 175 and 177. Pin 175 extends through the cover 122, one of the openings 185 or 187 of drawer 172, through the horizontally partition 132 and through one of the openings 185 or 187 of drawer 176 and into the floor 128. The pin 177 is used in a similar manner for pivotally supporting swinging drawers 174 and 178.

The partition 132 and the floor 128 are each provided with an upwardly extending boss 189, and these bosses are arranged diagonally opposite the pins 175 and 177. The under side of each of the swinging drawers is provided with an upwardly extending recess, disposed diagonally opposite the drill opening 187 of the drawer and at the same distance from the axis of the opening 187 as the axis of the pin 175 is spaced from the boss 189. Likewise, the under side of the drawers are each provided wtih an arcuately shaped groove 193 disposed diagonally of the drill opening 185. The axis of the arcuately shaped groove is at the axis of the opening 185 and this arcuately shaped groove is spaced from the axis of the opening 185 the same distance that the boss 189 is spaced from the pin 175 and the recess 191 is spaced from the axis of the opening 187.

Figure 15:
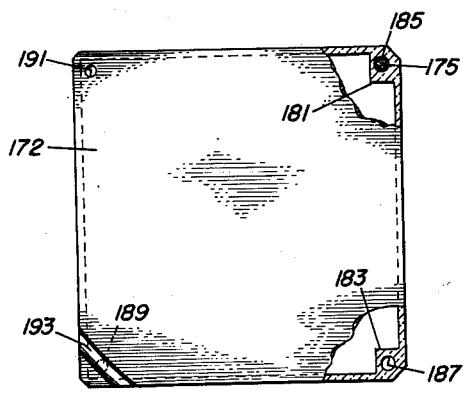
FIG. 15 is a bottom view of one of the pivotally mounted drawers, parts thereof being shown in sections.

When the swinging drawer is pivotally mounted on the pin 175 through the drilled opening 185, the groove 193 spans the boss 189 i.e., the boss 189 does not interfere with the swinging movement of the drawer. This is shown in FIG. 15. However, when the drawer is moved 90 degrees, from the position shown in FIG. 15, to that shown in FIG. 16, i.e., when the pin 175 is extending through drilled opening 187, then the drawer is yieldingly held in closed position because the boss engages the walls of the recess 191. However, as previously explained, the floor 128, the horizontal partition 132 and the cover 122 are each sufficiently resilient so that these can be flexed whereby the boss 189 can clear the recess 191.

While the forms of embodiment herein shown and described constitute preferred form, it is to be understood that other forms may be adopted falling within the scope of the claims that follow.

I claim:

1. A cabinet including a floor element; a vertically extending straight upright having the lower end thereof fixedly connected with the floor element; a cover element spaced from and disposed above the floor element and fixedly carried by the upright, said upright forming the sole permanent connection between the cover and floor, one of said elements having a vertically extending abutment; and a drawer carried by the floor element and having side walls extending to adjacent the cover element, said drawer having an abutment engageable with the first mentioned abutment whereby said abutments form stops for restraining movement of the drawer when it is in closed position, one of said aforementioned elements being sufficiently inherently resilient to yield to beyond abutting relationship of said abutments.

2. A cabinet as defined in claim 1, including means for pivotally mounting the drawer.

3. A cabinet including a floor element a vertically extending straight upright having the lower end thereof fixedly connected with the floor element; a cover element spaced from and disposed above the floor element and fixedly carried by the upright, said upright forming the sole permanent connection between the cover and floor; and a drawer carried by the floor element and having side walls extending to adjacent the cover element, said drawer having an abutment at the bottom thereof and said floor element having an abutment lying in the path of movement of the abutment of the drawer element whereby said abutments form stops for restraining movement of the drawer when it is in closed position, one of said aforementioned elements being sufficiently inherently resilient to yield to beyond abutting relationship of said abutments.

4. A cabinet as defined in claim 3, including means for pivotally mounting the drawer.

5. A cabinet including a floor element a vertically extending straight upright having the lower end thereof fixedly connected with the floor element; a cover spaced from the floor and fixedly carried by the upright, said upright forming the sole permanent connection between the cover and floor; and a drawer carried by the floor and having side walls extending to adjacent the cover, said drawer having an abutment at the bottom thereof and said floor having an abutment lying in the path of movement of the abutment of the drawer whereby said abutments form stops for restraining movement of the drawer when it is in closed position, said floor being sufficiently inherently resilient to yield to beyond the abutting relationship of said abutments.

6. A cabinet as defined in claim 5, including means for pivotally mounting the drawer.

7. A cabinet including a floor element a vertically extending straight upright having the lower end thereof fixedly connected with the floor element; a cover spaced from the floor and fixedly carried by the upright, said upright forming the sole permanent connection between the cover and floor; and a drawer carried by the floor and having side walls extending to adjacent the cover, said drawer having an abutment at the bottom thereof and said floor having an abutment lying in the path of movement of the abutment of the drawer whereby said abutments form stops for restraining movement of the drawer when it is in closed position, said cover benig sufficiently inherently resilient to yield to beyond the abutting relationship of said abutments.

8. A cabinet as defined in claim 7, including means for pivotally mounting the drawer.

9. A cabinet including a floor element a vertically extending straight upright having the lower end thereof fixedly connected with the floor element; a cover spaced from the floor and fixedly carried by the upright, said upright forming the sole permanent connection between the cover and floor; and a drawer carried by the floor and having side walls extending to adjacent the cover, said drawer having an abutment at the bottom thereof and said floor having an abutment lying in the path of movement of the abutment of the drawer whereby said abutments form stops for restraining movement of the drawer when it is in closed position, said floor and cover being sufficiently inherently resilient to yield to beyond the abutting relationship of said abutments.

10. A cabinet as defined in claim 9, including means for pivotally mounting the drawer.

11. A cabinet including a vertically extending upright; a floor element having an end connected with the upright; a cover element spaced from and disposed above the floor element and carried by the upright, one of said elements having a vertically extending abutment; a drawer carried by the floor element and having side walls extending to adjacent the cover element; means on the drawer and floor element for guiding the drawer in either of two shiftable positions of the drawer on the floor element, said drawer having an abutment engageable with the first mentioned abutment when the drawer is in one of said two shiftable positions and said abutments being non-aligned when the drawer is in the other of said two shiftable positions, one of said aforementioned elements being sufficiently resilient to yield to beyond abutting relations of said abutments.

12. A cabinet as defined in claim 11, in which the drawer is pivotally mounted at either of two points thereof.

13. A cabinet as defined in claim 11, in which the drawer is provided with a groove for receivng the abutment when the drawer is in the said other of the two positions.

14. A cabinet as defined in claim 12, in which the drawer is provided with a groove for receiving the abutment when the drawer is in the other of the two positions.

15. A cabinet as defined in claim 13, in which the groove is open at both ends.

16. A cabinet as defined in claim 14, in which the groove is open at both ends.

References Cited in the file of this patent

UNITED STATES PATENTS

| 1,196,002 | Leo | Aug. 29, 1916 |
| 2,295,747 | Mills | Sept. 15, 1942 |
| 2,358,194 | White | Sept. 12, 1944 |
| 2,534,100 | Baumgartner | Dec. 12, 1950 |
| 2,775,498 | Gettel | Dec. 25, 1956 |
| 2,949,951 | Schoen | Aug. 23, 1960 |